(12) United States Patent
van't Hoff

(10) Patent No.: US 6,851,575 B2
(45) Date of Patent: Feb. 8, 2005

(54) PRESSURIZED PACKAGE COMPRISING A PRESSURE CONTROL DEVICE

(75) Inventor: Jaap Herman van't Hoff, Oud-Beijerland (NL)

(73) Assignee: Packaging Technology Holding S.A., Luxembourg (LU)

( * ) Notice: Subject to any disclaimer, the term of this patent is extended or adjusted under 35 U.S.C. 154(b) by 0 days.

(21) Appl. No.: 10/058,764

(22) Filed: Jan. 30, 2002

(65) Prior Publication Data

US 2002/0179634 A1 Dec. 5, 2002

Related U.S. Application Data

(63) Continuation-in-part of application No. PCT/NL00/00546, filed on Jul. 31, 2000.

(30) Foreign Application Priority Data

Jul. 30, 1999 (NL) .............................................. 1012754

(51) Int. Cl.[7] .............................................. B67D 5/08
(52) U.S. Cl. ...................... 222/55; 222/61; 222/402.1; 222/464.1
(58) Field of Search .............................. 222/52, 55, 61, 222/62, 105, 402.1, 402.2, 402.13, 402.24, 394, 396, 464.1

(56) References Cited

U.S. PATENT DOCUMENTS

| | | | |
|---|---|---|---|
| 35,402 A | 5/1862 | Thompson | |
| 4,257,560 A | 3/1981 | Diamond | .................... 239/337 |
| 4,487,334 A | 12/1984 | Werding | ..................... 222/394 |
| 4,561,465 A | 12/1985 | Rogers | |
| 4,650,094 A * | 3/1987 | Werding | ....................... 222/55 |
| 4,940,169 A * | 7/1990 | Ball | .......................... 222/399 |
| 5,033,505 A | 7/1991 | Eidsmore | |
| 5,042,697 A * | 8/1991 | Warren | .................... 222/402.1 |
| 5,090,595 A * | 2/1992 | Vandoninck | ................. 222/54 |
| 5,285,931 A * | 2/1994 | Alfons | ........................ 222/61 |
| 5,303,734 A | 4/1994 | Eidsmore | |
| 5,341,968 A | 8/1994 | Vandoninck | ................. 222/394 |
| 5,368,207 A * | 11/1994 | Cruysberghs | ............... 222/396 |
| 6,026,850 A | 2/2000 | Newton et al. | |
| 6,145,712 A | 11/2000 | Benoist | ....................... 222/402 |
| 2002/0179151 A1 * | 12/2002 | van't Hoff | ............. 137/505.41 |

FOREIGN PATENT DOCUMENTS

| | | |
|---|---|---|
| EP | 0826 608 A1 | 3/1998 |
| WO | WO 01/09009 | 7/2000 |

OTHER PUBLICATIONS

PCT International Preliminary Examination Report dated Oct. 23, 2001 for PCT/NL00/00546 dated Jul. 31, 2000.
PCT International Search report for PCT/NL00/00546.

* cited by examiner

Primary Examiner—Gene Mancene
Assistant Examiner—Patrick Buechner
(74) Attorney, Agent, or Firm—Fish & Richardson P.C.

(57) ABSTRACT

A pressurized package assembly includes a package having an least one outlet. In use, an inner space of the package is filled with a fluid that is dispensed via the outlet. In the inner space of the package, there prevails a pressure which can vary. The assembly also includes a pressure control device for feeding to the outlet, via the pressure control device, the fluid at a predetermined constant pressure.

37 Claims, 2 Drawing Sheets

PRESSURIZED PACKAGE COMPRISING A PRESSURE CONTROL DEVICE

RELATED APPLICATIONS

This is a Continuation-in-Part of PCT/NL00/00546, filed Jul. 13, 2000, which published in English as WO 01/09009 on Feb. 8, 2001.

FIELD OF THE INVENTION

The present invention is directed to pressurized assemblies for dispensing a fluid.

BACKGROUND OF THE INVENTION

The prior art includes an assembly comprising a package and at least one outlet wherein, in use, an inner space of the package is filled with fluid to be dispensed, wherein in the inner space of the package there prevails a pressure for enabling dispensing the fluid via the outlet, the assembly further comprising a pressure control device connected to the outlet adjacent the outlet, for feeding the fluid to the outlet via the pressure control device at a predetermined constant pressure which is independent of and less than the pressure prevailing in the inner space of the package, the pressure control device comprising a housing provided with an inflow opening, an outflow opening and a fluid flow path extending in the housing between the inflow opening and the outflow opening, the inflow opening being in fluid connection with the inner space of the package and the outflow opening being in fluid connection with the outlet, the pressure control device being located in the proximity of the outlet and further comprising a controllable seal for releasing and closing the fluid flow path and a pressure sensor element accommodated in the housing for movement between a first and a second position, the pressure sensor element in the first position controlling the controllable seal to release the fluid path and in the second position controlling the controllable seal to close off the fluid path, the pressure sensor element on the one hand being exposed to the pressure prevailing in the fluid path downstream of the controllable seal, and on the other being exposed to a predetermined force which, in use, determines the predetermined pressure, wherein, in use, the pressure sensor element moves in the direction of the first position when the pressure prevailing in the fluid flow path downstream of the seal drops below the predetermined pressure determined by the predetermined force and the pressure sensor element moves in the direction of the second position when the pressure prevailing in the fluid flow path downstream of the seal rises above the predetermined pressure determined by the predetermined force.

Such assembly is known per se. In this respect, one may think of an aerosol can, a vessel or a bag-in-box, filled with a fluid to be dispensed. This fluid may be a gas as well as a liquid. When a fluid is a liquid, this may also be a viscous liquid. In this patent application, "a fluid" is also understood to mean a cream, paste, gel, powdery substance and possible combinations thereof. Known examples are aerosol cans for dispensing an atomized liquid, vessels for dispensing liquids such as beer, bag-in-box for dispensing products suitable for consumption, such as coffee concentrate, ketchup, etc.

Thus, the prior art also includes packages filled with liquids and/or gases and/or powder, while the inner space of the package containing the product to be dispensed is pressurized for dispensing said products. For pressurizing the inner space, use can be made of, for instance, an inert propellant, such as nitrogen.

A device in the form of spray for an aerosol of the type described above is known from EP-A-0826608. In this known device, the pressure sensor element is provided with a chamber communicating with the outside air, which chamber accommodates a spring for generating said predetermined force. Included in the chamber is a diaphragm which is movable in axial direction of the chamber. On an inner side of the chamber, the spring presses against a first side of the diaphragm. On a second side of the diaphragm, opposite the first side of the diaphragm, a pin is attached to the diaphragm which, through up and down movement of the diaphragm, can close or release the fluid path. On the second side, the diaphragm is exposed to the pressure prevailing in the fluid flow path.

A problem of the known device is that it does not operate accurately during pressure control. In the known device, the diaphragm also influences the control of the gas pressure. Indeed, the diaphragm has a certain rigidity and a limited freedom of movement. Further, the spring provides rather an inaccurate reference force exerted on the diaphragm. This reference force codetermines the pressure set by the pressure control device. Further, the set pressure is also dependent on the atmospheric outside pressure to which the diaphragm is exposed.

EP-A-0 931 734 also discloses a pressure control device. This pressure control device is, however, not provided with a gas tight chamber. Instead it comprises a chamber which is in open communication with the outside world wherein a spring is provided in the chamber for obtaining an additional force.

EP-A-0 583 825 also discloses a pressure control device. This pressure control device, however, is accommodated in the diptube. Further, it applies that it comprises a plunger which is movable in a direction perpendicularly to the direction from the inflow opening to the outflow opening. This means that the closing and releasing of the fluid flow path take place in a particularly inaccurate manner. It also comprises a closing seal which is movable in a direction perpendicularly to the direction of the fluid path at the closing seal with the disadvantage.

SUMMARY OF THE INVENTION

The object of the invention is to provide a solution to this problem and the invention is characterized in that the pressure control device comprises a gas tight chamber, the pressure sensor element comprising a plunger accommodated in the chamber for movement in an axial direction of the chamber between the first and the second position, the space enclosed by the plunger and the chamber being filled with a gas for generating said predetermined force and the plunger being movable between the first and the second position in a direction parallel to the direction of the fluid path at the controllable seal.

Since the setting of the position of the plunger is only a result of the pressure prevailing in the fluid flow path and the pressure in the chamber, a highly accurate control is effected. Moreover, the position of the plunger between the first and the second extreme position does not affect the sum of the forces to which the plunger is subjected. This means that the pressure control is realized in a very accurate manner.

Because the plunger is movable between the first and the second position in a direction of the fluid path at the controllable seal forces of the flow of fluid acting on the plunger will not cause friction between the plunger and the housing during movement of the plunger. It also follows that according to a practical embodiment of the assembly the plunger is generally movable between the first and the second position in a direction parallel to a direction from the inflow opening to the outflow opening. Preferably the controllable seal is movable in a direction parallel to the fluid path at the controllable seal. This has also the advantage that forces acting from the flow of fluid at the seal and/or plunger will not cause friction between the plunger and/or controllable seal on the one hand and the housing on the other hand during movement of the plunger and/or controllable seal between the first position and the second position. In practice, the package can, for instance, be filled with the fluid for 90%. The remaining 10% can be filled with an inert gas for obtaining the prevailing pressure in the package. Preferably, this prevailing pressure is chosen to be relatively high, so that always sufficient pressure is present for generating the predetermined constant pressure which, after all, is lower than the prevailing pressure. However, it is also possible to fill the package with the fluid up to 95%. The remaining 5% is then utilized for being filled with the inert gas for obtaining the prevailing pressure. This prevailing pressure can then be chosen to be higher than the prevailing pressure in the example where the vessel is filled with the fluid for 90%. Indeed, if the amount of fluid in the package decreases to zero, it can then be effected that the inert gas added still generates a sufficient pressure in the package for obtaining the predetermined constant pressure.

In particular, it holds that the pressure control device is included in the inner space of the package. However, it is also possible that the pressure control device is provided outside the package. A possible use is the tapping of beer. This involves the assembly being used for dispensing an inert gas which is fed to an device known per se at the predetermined constant pressure. With the supply of the inert gas, this device draws off beer from another vessel filled with beer. In this example, the outlet of the assembly may comprise a coupling to which hoses can be attached, which pass the inert gas at the predetermined pressure to the known device for tapping beer. The outlet may then further comprise a shut-off valve for opening and closing the outlet. This shut-off valve can, for instance, be opened when the outlet is connected to the hose passing the inert gas to the device for tapping beer.

Hence, according to the invention, the pressure control device may be arranged both inside and outside the package.

In particular, it applies that the gas tight chamber is manufactured from a metal. This minimizes the chances of gas leaking away from the chamber, so that the accuracy of the pressure control device is guaranteed for a long period.

On the outside of the package, the outlet may be provided with a shutoff valve for opening and closing the outlet. The shut-off valve may consist of the push button known per se, which also includes a relatively small opening for atomizing the liquid. The push button then also forms a spray head. The package may comprise a can.

According to a preferred embodiment, it holds that the pressure control device comprises at least one sealing element, such as a rubber ring and the controllable seal comprises a bar-shaped element connected to the plunger outside the space enclosed by the chamber and the plunger, while in the first position, the bar-shaped element and the sealing element release the fluid flow path and in the second position, the bar-shaped element and the sealing element close the fluid flow path. The bar-shaped element is movable between the first and second position in a direction which is parallel to the direction of the fluid path along the bar-shaped element. Thus friction is avoided as discussed above. Another advantage is that the assembling of the pressure control device can be carried out with a cylinder which forms the walls of the chamber and which is fixed or not fixed.

BRIEF DESCRIPTION OF THE DRAWINGS

Hereinafter, the invention will be further specified with reference to the accompanying drawings. In these drawings.

DETAILED DESCRIPTION OF THE PREFERRED EMBODIMENT

Figure 1A:
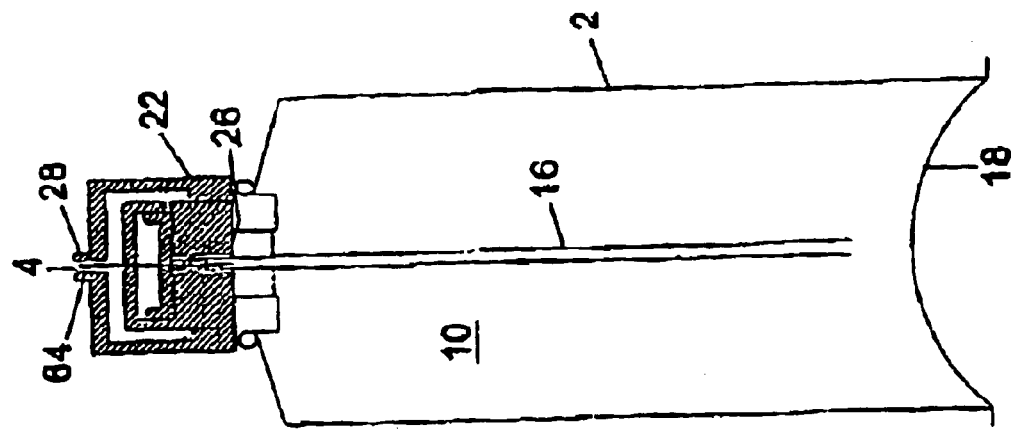
FIG. 1a is a first possible embodiment of an assembly according to the invention.

In FIG. 1a, reference numeral 1 designates an assembly according to the invention. The assembly 1 comprises a package 2 which, in this example, consists of a can known per se, such as the can of an aerosol can. The assembly further comprises an outlet 4 located on top of the package 2.

The outlet 4 is located on the outer side of the package. In this example, the outlet 4 comprises a push button, known per se, located on top of an aerosol can. Accordingly, outside the package, the outlet 4 comprises a shutoff valve 6, known per se, for opening and closing the outlet. The shut-off valve 6 is opened when the push button 8 of the outlet 4 is pressed upon. An inner space 10 of the package 2 is partially filled with a fluid 12, in this example consisting of a liquid. The fluid is the product which is to be dispensed. The inner space 10 can, for instance, be filled with the liquid 12 for 90%. In the remaining space of the inner space 10, an inert gas 14 is present, such as, for instance, nitrogen. By means of the inert gas 14, serving as a propellant, there is created in the inner space of the package a high pressure for dispensing the liquid 12 via the outlet 4 when the push button 8 is actuated.

The outlet 4 is further provided with an opening 20 for atomizing the liquid 12. When, in use, the push button 8 is actuated, liquid 12 is passed to the outlet 4 via the conduit 16, due to the pressure prevailing in the package, and the liquid is sprayed in atomized condition from the outlet through the opening 20. Hence, described up to this point, the assembly acts as an aerosol can known per se.

However, according to the invention, the assembly further comprises a pressure control device 22 for feeding the fluid 12 (in this example a liquid) to the inlet via the pressure control device, at a predetermined, constant pressure which is independent of, and less than, the pressure prevailing in the inner space 10 of the package 2 and generated by means of the propellant 14. Via a conduit 16 (a so-called diptube), the pressure control device is in fluid connection with the inner space 10 of the package 2. In this example, the conduit 16 extends to a position adjacent the bottom 18 of the package 2. Hence, the pressure control device is located between the outlet 4 and the diptube 16. Further, the pressure control device is located in the proximity of the outlet. The pressure control device is connected to the outlet. Both the outlet and the pressure control device are located at the top side of the package 2.

In this example, the inflow opening 26 is connected to an open end of the conduit or diptube 16. The other open end of the conduit 16 is located adjacent the bottom 18 of the package 2.

Figure 2:
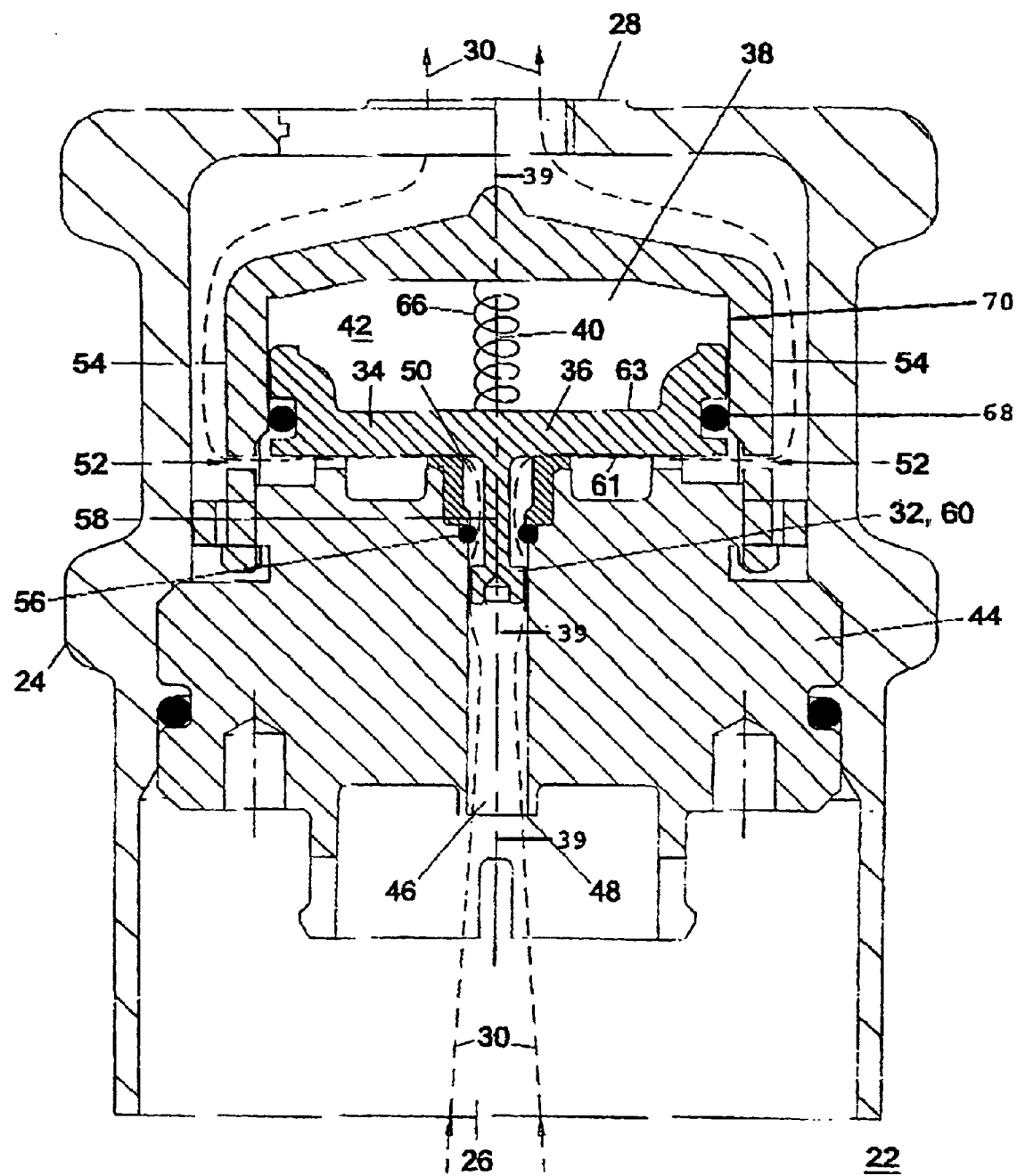
FIG. 2 is a possible embodiment of a pressure control device of the assembly according to FIGS. 1a and 1b.

A possible embodiment of the pressure control device 22 is shown in FIG. 2. The pressure control device 22 comprises a housing 24 comprising an inflow opening 26, an outflow opening 28 and a fluid flow path 30 extending in the housing 24 between the inflow opening 26 and the outflow opening 28. In this example, the fluid flow path 30 is indicated schematically by dotted lines.

The inflow opening 26 is in fluid connection with the inner space of the package. The outflow opening 28 is in fluid connection with the outlet 4. In this example, the outflow opening 28 is connected to the outlet 4 located on the outside of the package 2.

The pressure control device 22 further comprises a controllable seal 32 for releasing and closing the fluid flow path 30.

The pressure control device further comprises a pressure sensor element 34, included in the housing for movement between a first and a second position. In FIG. 2, the pressure sensor element 34 is in the first position. In this example, the pressure sensor element 34 comprises a plunger 36 accommodated in a chamber 38 formed in the pressure control device 22. In this example, the chamber 38 is of cylindrical design. The plunger is accommodated in the chamber 38 for movement in axial direction 40 between the first and the second position. The plunger is movable between the first and the second position in a direction parallel to a direction 39 (in this example a vertical direction) from the inflow opening to the outflow opening.

The space 42 enclosed by the plunger 36 and the chamber 38 is filled with a gas for generating a predetermined force pressing the plunger 36 in a direction of the first position. In this example the predetermined gas pressure in the space 42 is higher than the atmospheric pressure. In the example of FIG. 2, this direction is vertically downward.

The pressure control device further comprises a bush-shaped part 44 in which a channel 46 is formed. The fluid flow path 30 extends through the relevant channel. An open bottom side 48 of the channel 46 communicates with the inflow opening 26. An open top side 50 of the channel 46 is in fluid connection with the outflow opening 28, in this example via two openings 52, each opening provided in a sidewall 54 of the chamber 38. Both in the first and in the second position of the plunger 36, the openings 52 are below the plunger 36, i.e. the openings 52 are located outside the space 42 enclosed by the chamber 38 and the plunger 36.

In this example, the pressure control device comprises a sealing element, such as a rubber ring 56, included in the channel 46. The rubber ring is attached to the housing, in this example to an inner wall of the channel 46. The controllable seal comprises a bar-shaped element 58 connected, outside the space 42 enclosed by the plunger 36 and the chamber 38, with the plunger 36. In this example, the bar-shaped element 58 extends through the rubber ring 56 and has its bottom side provided with a knob 60. In the first position, the knob 60 and the sealing ring 56 are separated from each other to release the fluid path 30. When, in FIG. 2. the plunger 36 moves upward in vertical direction, the plunger 36 will move from the first position to the second position. As a result, the knob 60 will likewise move upward and will, when the plunger 36 reaches its second position, abut against the bottom side of the rubber ring 56 to close off the fluid path 30. Hence, the plunger 36 is in the second position when the knob 60 has moved upward and abuts against the rubber ring 56.

It also follows that the plunger 36 is movable between the first and the second position in a direction 39 parallel to the fluid path at the controllable seal 32, 60. It also follows that the controllable seal 32, 60 is movable in a direction 39 parallel to the fluid path at the controllable seal. This has the advantage that forces acting from the flow of fluid at the seal and/or plunger will not cause friction between the plunger and/or controllable seal on the one hand and the housing on the other hand during movement of the plunger and/or controllable seal. It also follows that the bar-shaped element 58 is movable between the first and second position in a direction 39 which is parallel to the direction of the fluid path along the bar-shaped element. This has the same advantage as discussed above.

A sealing element such as a sealing ring 68 is provided between the plunger and an inner wall 70 of the chamber 38. The sealing ring 68 is attached to the plunger 36 so that the sealing ring is movable relative the chamber. The sealing ring 68 may be a rubber sealing ring.

The bottom side 61 of the plunger 36 is exposed to the pressure prevailing in the fluid flow path downstream of the controllable seal 32, i.e. the pressure at the outflow opening 28. On the other hand, the top side 63 of the plunger 36 is exposed to the predetermined pressure present in the space 42. This predetermined pressure generates a predetermined force pressing the plunger 36 in a direction of the first position. Conversely, the pressure prevailing at the outflow opening 28 presses the plunger 36 in a direction (if the second position. As a result, the pressure sensor element (the plunger 36) moves in the direction of the first position when the pressure prevailing in the fluid flow path downstream of the seal drops below the pressure predetermined by the predetermined force. Further, the pressure sensor element 36 (the plunger 36) moves in the direction of the second position when the pressure prevailing in the fluid flow path downstream of the seal 32 rises above the pressure predetermined by the predetermined force.

The above has as a result that the device operates as follows. In the package 2, there prevails a pressure higher than the predetermined pressure at which the liquid 12 is to be dispensed via the outlet 4. When the outlet 4 is opened, the liquid 12 will flow into the pressure control device 22 via the diptube 16 and the inflow opening 26. The liquid 12 will then flow to the outflow opening 28 via the liquid flow path 30. Via the outflow opening 28, the liquid 12 flows further to the outlet 4.

When the pressure of the liquid 12 at the outflow opening 28 rises above the predetermined, desired pressure, the pressure of the liquid at the bottom side 61 of the plunger 36 will likewise rise above the predetermined value. In this example, the predetermined constant pressure at which the liquid 12 is to be dispensed to the outlet 6 is equal to the pressure prevailing in the space 42. As a result, the plunger 36 will be moved upward. After all, the pressure in the space 42 is less than the pressure prevailing at the bottom side 61 of the plunger 36. The plunger then moves frown the first position in the direction of the second position. In and/or adjacent the second position, the plunger 36 will control the seal 32, 60, 56 such that it closes off the fluid path 30. During closing of the fluid flow path 30, the pressure of the liquid at the outflow opening 28 will drop. This pressure drop continues until the pressure at the outflow opening 28 is equal to the pressure prevailing in the space 42. When the pressure of the liquid 12 at the outflow opening 28 threatens to drop below the pressure prevailing in the space 42, the plunger 36 will tend to move again in the direction of the first position. Consequently, the seal 32 will be controlled in such a manner that it will be slightly opened. As the seal 32 is opened again, the pressure at the outflow opening 28 will rise again, until the seal 32 is closed again when the plunger 36 is moved up again due to the rising pressure. This process continues and leads to an equilibrium condition at which the pressure of the liquid 12 at the outflow opening 28 assumes the predetermined value determined by the predetermined pressure in the chamber 42, exerting the predetermined force on a top side 63 of the plunger. If the fluid 12 with which the package 2 is filled consists of a gas, the conduit 16 may even be omitted entirely. In that case, the gas 12 can flow directly through the pressure control device 22 via the inflow opening 26 and be fed to the outlet 4 at a predetermined pressure. Optionally, the propellant can be omitted, because the gaseous fluid 12 then provides for the pressure itself.

Figure 1B:
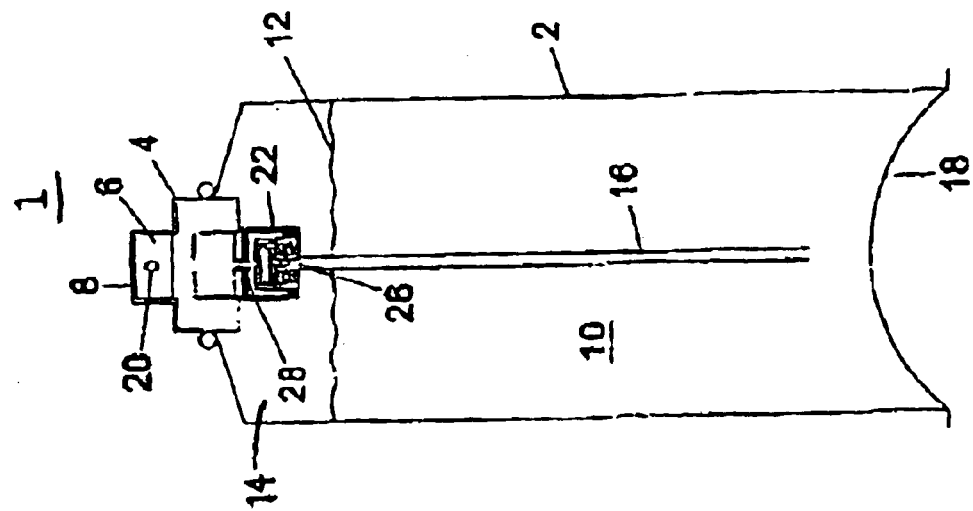
FIG. 1b is a second possible embodiment of an assembly according to the invention.

FIG. 1b shows a second embodiment of an assembly according to the invention. Here, parts corresponding to FIG. 1a are again provided with the same reference numerals. In this example, the pressure control device 22 is provided outside the package 2. In this example, the inflow opening 26 of the pressure control device 22 is in fluid connection with the inner space 10 of the package via the conduit 16. As is discussed in relation to FIG. 1, the conduit 16 extends to a position adjacent the bottom 18 of the package 2. The outlet 4 in this example is formed by a collar 64 provided around the outflow opening 28, 20 of the pressure control device 22. The collar 64 may further comprise a shut-off valve for opening and closing the outflow opening 28.

The package 2 may again be filled with a fluid 12 in the form of a liquid. The operation is again entirely identical as discussed in relation to FIGS. 1a and 1b. When the outflow opening 28 is opened, the liquid 12 will flow via the conduit 16 to the inflow opening 26 of the pressure control device 22, due to the pressure prevailing in the package 2. Next, the liquid 12 will leave the pressure control device 22 via the outflow opening 28 at said predetermined pressure. The fluid may again also consist of a viscous liquid, as discussed in relation to FIGS. 1a and 1b. In particular, however, it applies that the fluid consists of a gas such as nitrogen. The pressure of the nitrogen will again be relatively high, as discussed herein above. In that case, the conduit 16 can be left out, with the inflow opening 26 of the pressure control device 22 being in direct fluid contact with the inner space 10 of the package. The collar 64 can then be connected, for instance via a rubber hose, to a device known per se for tapping beer. This device for tapping beer, known per se, should be fed with an inert gas at, preferably, constant pressure. The assembly according to FIG. 1b is now capable of supplying this inert gas at the predetermined constant pressure. Also when a large amount of nitrogen has already been dispensed, as a result of which the package 2 is already partially empty, the nitrogen is still dispensed at the constant predetermined pressure, so that beer of a constant quality can be tapped.

The invention is in no way limited to the embodiments outlined herein above. Thus, the predetermined force on the pressure sensor element/plunger 34 may in addition be generated by means of a spring 66, as is shown in dotted lines in FIG. 2. The sealing element 56 may be attached to the bar shaped element 60 and being movable in a recess of the inner wall of the channel 46 for releasing and closing the fluid path if the plunger moves between tie first and second position.

In this patent application, "a fluid" is also understood to mean a cream, paste, gel, powdery substance and possible combinations thereof. Such variants are each understood to fall within the framework of the invention.

What is claimed is:

1. An assembly comprising a package and at least one outlet wherein, in use, an inner space of the package is filled with a fluid to be dispensed, wherein in the inner space of the package there prevails a pressure for enabling dispensing the fluid via the outlet, the assembly further comprising a pressure control device connected to the outlet adjacent the outlet, for feeding the fluid to the outlet via the pressure control device at a predetermined constant pressure which is independent of, and less than, the pressure prevailing in the inner space of the package, the pressure control device comprising a housing provided with an inflow opening, an outflow opening and a fluid flow path extending in the housing between the inflow opening and the outflow opening, the inflow opening being in fluid connection with the inner space of the package and the outflow opening being in fluid connection with the outlet, and the pressure control device further comprising a controllable seal for releasing and closing the fluid flow path and a pressure sensor element accommodated in the housing for movement between a first and a second position, the pressure sensor element in the first position controlling the controllable seal to release the fluid path and in the second position controlling the controllable seal to close off the fluid path, the pressure sensor element on the one hand being exposed to the pressure prevailing in the fluid path downstream of the controllable seal, and on the other being exposed to a predetermined force which, in use, determines the predetermined pressure, wherein, in use, the pressure sensor element moves in the direction of the first position when the pressure prevailing in the fluid flow path downstream of the seal drops below the predetermined pressure determined by the predetermined force and the pressure sensor element moves in the direction of the second position when the pressure prevailing in the fluid flow path downstream of the seal rises above the predetermined pressure determined by the predetermined force, wherein the pressure control device comprises a gas tight chamber, the pressure sensor element comprising a movable wall accommodated in the chamber for movement in an axial direction of the chamber between the first and the second position, the space enclosed by the movable wall and the chamber being filled with a gas for generating said predetermined force and the movable wall being movable between the first and the second position in a direction parallel to the direction of the fluid path at the controllable seal, wherein:

the movable wall is formed by a plunger accommodated in the chamber for movement in the axial direction of the chamber between the first and second position, the plunger and the controllable seal are movable between the first and the second position in a direction parallel to a direction from the inflow opening to the outflow opening, and the pressure control device is located in the proximity of the outlet.

2. An assembly according to claim 1, wherein the inflow opening of the pressure control device is connected to a diptube, so that the pressure control device is accommodated between the outlet and the diptube.

3. An assembly according to claim 1, wherein the outlet is located on a top side of the package.

4. An assembly according to claim 1, wherein the pressure control device is accommodated in the inner space of the package.

5. An assembly according to claim 1, wherein the pressure control device is provided outside the package.

6. An assembly according to claim 1, wherein the gas tight chamber is manufactured from a metal.

7. An assembly according to claim 1, wherein at the outside of the package, the outlet comprises a shut-off valve for opening and closing the outlet.

8. An assembly according to claim 1, wherein the outlet is mounted adjacent the outflow opening on the housing of the pressure control device.

9. An assembly according to claim 1, wherein the outlet is located on top of the pressure control device.

10. An assembly according to claim 1, wherein the pressure control device comprises a spring for generating a part of said predetermined force, the spring being accommodated in the space enclosed by the plunger and the chamber, wherein the spring presses the plunger in the direction of the first position.

11. An assembly according to claim 1, wherein the pressure control device comprises at least one sealing element and the controllable seal comprises a bar-shaped element, connected to the plunger, the sealing element extending around the bar-shaped element and being connected to a housing of the pressure control device, the fluid flow path extending through the sealing element, the sealing element and the bar-shaped element in the first position releasing the fluid flow path, and the sealing element and the bar-shaped element in the second position closing the fluid flow path.

12. An assembly according to claim 11, wherein, the bar-shaped element is movable between the first and second position in a direction which is parallel to the direction of the fluid path along the bar-shaped element.

13. An assembly according to claim 1, wherein the package comprises one of an aerosol can and a bag-in-box.

14. An assembly according to claim 1, wherein the fluid consists of a gas or liquid which may or may not be viscous.

15. An assembly according to claim 1, wherein, in use, the inner space of the package is also filled with an inert gas for obtaining the pressure in the inner space of the package.

16. An assembly according to claim 15, wherein the gas pressure in the inner space is greater than an atmospheric pressure.

17. An assembly according to claim 1, wherein the controllable seal is movable in a direction parallel to the fluid path at the controllable seal.

18. An assembly according to claim 1, wherein a sealing element is provided between the plunger and an inner wall of the chamber.

19. An assembly according to claim 18, wherein the sealing element is attached to the plunger so that the sealing element is movable relative to the chamber.

20. The assembly of claim 1, wherein the plunger and controllable seal are connected to regulate the pressure in the fluid path based only on a difference between the pressure prevailing in the fluid flow path downstream of the seal and the pressure of the gas enclosed by the movable wall and the chamber.

21. The assembly of claim 1, wherein the position of the movable wall with respect to the housing is determined by a sum of axial forces resulting from the pressure prevailing in the fluid flow path downstream of the seal and the pressure of the gas enclosed by the movable wall and the chamber, the sum of axial forces in the closed-off state and in the released state being the same.

22. The assembly of claim 1, wherein the predetermined force is determined solely by the pressure of the gas enclosed by the movable wall.

23. The assembly of claim 1, wherein, if the pressure prevailing in the fluid flow path downstream of the controllable seal drops below the pressure of gas enclosed by the movable wall and the chamber, the movable wall and the controllable seal operate to release the fluid flow path, thereby feeding the fluid to the outlet at the predetermined constant pressure.

24. A pressure control device for delivering a fluid at a predetermined pressure, the device comprising:

a housing provided with an inflow opening, an outflow opening and a fluid flow path extending in the housing between the inflow opening and the outflow opening;

a controllable seal for releasing and closing the fluid flow path; and a pressure sensor element accommodated in the housing for movement between a first and a second position, the pressure sensor element in the first position controlling the controllable seal to release the fluid path and in the second position controlling the controllable seal to close off the fluid path, the pressure sensor element on the one hand being exposed to the pressure prevailing in the fluid path downstream of the controllable seal, and on the other being exposed to a predetermined force which determines the predetermined pressure, wherein the pressure sensor element moves in the direction of the first position when the pressure prevailing in the fluid flow path downstream of the seal drops below the predetermined pressure determined by the predetermined force and the pressure sensor element moves in the direction of the second position when the pressure prevailing in the fluid flow path downstream of the seal rises above the predetermined pressure determined by the predetermined force, wherein the pressure control device comprises a gas tight chamber, the pressure sensor element comprising a movable wall accommodated in the chamber for movement in an axial direction of the chamber between the first and the second position, the space enclosed by the movable wall and the chamber being filled with a gas for generating said predetermined force and the movable wall being movable between the first and the second position in a direction parallel to the direction of the fluid path at the controllable seal, wherein:

the movable wall is formed by a plunger accommodated in the chamber for movement in the axial direction of the chamber between the first and second position, and the plunger and the controllable seal are movable between the first and the second position in a direction parallel to a direction from the inflow opening to the outflow opening.

25. The pressure control device of claim 24, wherein the plunger and controllable seal are connected to regulate the pressure in the fluid path based only on a difference between the pressure prevailing in the fluid flow path downstream of the seal and the pressure of the gas enclosed by the movable wall and the chamber.

26. The pressure control device of claim 24, wherein the position of the movable wall with respect to the housing is determined by a sum of axial forces resulting from the pressure prevailing in the fluid flow path downstream of the seal and the pressure of gas enclosed by the movable wall and the chamber, the sum of axial forces in the closed-off state and in the released state being the same.

27. The pressure control device of claim 24, wherein the predetermined force is determined solely by the pressure of the gas enclosed by the movable wall.

28. The pressure control device of claim 24, wherein, if the movable wall and the controllable seal operate to close off the fluid flow path, the pressure prevailing in the fluid flow path downstream of the controllable seal drops until the pressure prevailing in the fluid flow path downstream of the controllable seal equals the pressure of gas enclosed by the movable wall and the chamber, so as to deliver fluid to the outflow opening at the predetermined pressure.

29. The pressure control device of claim 28, wherein, if the pressure prevailing in the fluid flow path downstream of the controllable seal drops below the pressure of gas enclosed by the movable wall and the chamber, the movable wall and the controllable seal operate to release the fluid flow path, so as to limit delivery of fluid to the outflow opening at less than the predetermined pressure.

30. The pressure control device of claim 24, comprising a spring for generating a part of the predetermined force to press the plunger in the direction of the first position.

31. A pressurized package for delivering a fluid, comprising:
  an enclosed space, the enclosed space comprising a pressurized fluid to be delivered;
  an outlet;
  a fluid path extending between an opening to the enclosed space and the outlet, the outlet being disposed downstream of the enclosed space along the fluid path;
  a first valve, the first valve having a normal position obstructing passage of fluid along the fluid path and an in-use position allowing passage of fluid along the fluid path; and
  a pressure-regulating device comprising:
    a sealed chamber comprising an enclosed fluid having a first pressure and being disposed downstream to the opening to the enclosed space;
    a second valve disposed along the fluid path between the enclosed space and the outlet, the second valve being movable between a first position obstructing passage of the pressurized fluid along the fluid path from the enclosed space to the outlet and a second position allowing the pressurized fluid to pass along the fluid path from the enclosed space to the outlet; and
    wherein a pressure of fluid present along the fluid path downstream of the second valve urges the second valve toward the first position and the first pressure of the enclosed fluid present within the sealed chamber urges the second valve toward the second position.

32. The pressurized package of claim 31, wherein the second valve is configured to regulate the pressure based only on a difference between the pressure of fluid present along the flow path downstream of the second valve and the first pressure of the fluid present within the sealed chamber.

33. The pressurized package of claim 31, wherein the position of the second valve with respect to the sealed chamber is determined by a sum of axial forces resulting from the pressure of fluid present along the flow path downstream of the second valve and the first pressure of fluid present within the sealed chamber, the sum of axial forces in the closed state and in the open state being the same.

34. The pressurized package of claim 31, wherein the sealed chamber includes a movable wall operably connected to the second valve, the only force urging the second valve toward the second position being supplied by the first pressure fluid present within the sealed chamber.

35. The pressurized package of claim 31, wherein, if the second valve operates to obstruct the fluid flow path, the pressure of fluid present along the flow path downstream of the second valve drops until the pressure of fluid present along the flow path downstream of the second valve equals the first pressure of fluid present within the sealed chamber, so as to deliver fluid to the outlet at the first pressure.

36. The pressurized package of claim 35, wherein, if the pressure of fluid present along the flow path downstream of the second valve drops below the first pressure of fluid present within the sealed chamber, the second valve operates to allow passage along the fluid path, so as to limit delivery of the fluid to the outlet at less than the first pressure.

37. The pressurized package of claim 31, wherein the pressure-regulating device comprises a spring that urges the second valve in the direction of the second position.

* * * * *